United States Patent
Kloeppner et al.

(10) Patent No.: US 11,231,632 B2
(45) Date of Patent: Jan. 25, 2022

(54) LOW-VOLATILE ELECTRO-OPTIC ELECTROLYTE SOLVENTS CONTAINING CYLIC ORGANIC CARBONATES

(71) Applicant: GENTEX CORPORATION, Zeeland, MI (US)

(72) Inventors: Leroy J. Kloeppner, Jenison, MI (US); Zachary B. Erno, Grand Rapids, MI (US); Steven D. Looman, Holland, MI (US); Michael T. Stephenson, Holland, MI (US); Michelle M. Carroll, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 702 days.

(21) Appl. No.: 16/218,546

(22) Filed: Dec. 13, 2018

(65) Prior Publication Data
US 2020/0192173 A1   Jun. 18, 2020

(51) Int. Cl.
*G02F 1/155* (2006.01)
*G02F 1/157* (2006.01)
*G02F 1/1516* (2019.01)
*G02F 1/1503* (2019.01)
*C09K 9/02* (2006.01)
*G02F 1/1514* (2019.01)

(52) U.S. Cl.
CPC ............ *G02F 1/15165* (2019.01); *C09K 9/02* (2013.01); *G02F 1/1503* (2019.01); *G02F 1/155* (2013.01); *G02F 1/157* (2013.01); *G02F 1/1516* (2019.01); *G02F 2001/15145* (2019.01)

(58) Field of Classification Search
CPC ........ G02F 1/155; G02F 1/157; G02F 1/1503; G02F 1/15165; G02F 2001/15145
See application file for complete search history.

(56) References Cited

U.S. PATENT DOCUMENTS

| | | | |
|---|---|---|---|
| 5,651,918 A | 7/1997 | Scherowsky et al. | |
| 2003/0042473 A1* | 3/2003 | Kloeppner | G02F 1/1503 252/583 |
| 2009/0002803 A1* | 1/2009 | Tonar | G02F 1/161 359/273 |

FOREIGN PATENT DOCUMENTS

RU   2130630 C1   5/1999

OTHER PUBLICATIONS

International Search Report dated Sep. 5, 2019, for corresponding PCT application No. US2018/065320, 3 pages.
Written Opinion of the International Searching Authority dated Sep. 5, 2019, for corresponding PCT application No. US2018/065320, 5 pages.

* cited by examiner

*Primary Examiner* — Bijan Ahvazi
(74) *Attorney, Agent, or Firm* — Price Heneveld LLP; Brian James Brewer

(57) ABSTRACT

An electrochromic medium for use in an electro-optic device comprises a solvent comprising at least one low-volatile organic electrolyte solvent based on a cyclic carbonate ester; an anodic electroactive material; and a cathodic electroactive material; and at least one of the anodic and cathodic electroactive materials is electrochromic.

17 Claims, 3 Drawing Sheets

LOW-VOLATILE ELECTRO-OPTIC ELECTROLYTE SOLVENTS CONTAINING CYLIC ORGANIC CARBONATES

FIELD OF THE INVENTION

This disclosure relates to media that comprise organic electrolyte solvents for use in electro-optic devices, and more particularly, to media that comprise the use of a low volatile organic carbonate electrolyte solvent for use in an electro-optic device.

BACKGROUND

Electrochromic (EC) and electro-optic (EO) devices are often used in harsh conditions and may be exposed to wide variations in temperature. This requires that the electrolyte solvents used in the devices meet a variety of constraints, including having the ability to operate over a wide temperature range. The solvents also need to be relatively stable under all reasonably expected environmental conditions. They should be compatible with the coatings and other chemicals used in the device components such as the electrode coatings, device seals, and other chemicals in an EC and/or EO device, should have low toxicity and should be relatively colorless and transparent.

Currently, most solution-based EC and EO systems use one or more polar, aprotic, high-dielectric solvents like propylene carbonate (PC), ethylene carbonate, gamma-butyrolactone (GBL) as the electrolyte solvent, with many EC and EO devices, including smart mirrors and windows, using PC. The electrolyte solvent allows for the free diffusion of electrochromic compounds, electroactive compounds, and/or supporting electrolyte materials through EC films and between anodic and cathodic electrodes. It is this free diffusion of electrochromic, electroactive, and/or supporting electrolyte materials through the EC film that allows the EC film to be electrically conductive and the EC device to operate properly.

In many cases, the electrolyte solvent may be used in combination with a polymer gel or thickener material, and the polymer gel or thickener may optionally be crosslinked. The EC film may be thickened or become a free standing solid. In such cases, the solvent may be referred to as a "plasticizer." This disclosure does not distinguish between solvents and plasticizers.

However, in certain situations, the PC electrolyte solvent may be flammable. The gelled form of PC may burn upon exposure to a flame source and may continue to burn after the removal of the flame source. A less flammable or noncombustible solvent may be desirable when there is a potential for the solvent and/or EC film to be exposed to a flame.

Furthermore, in some situations, especially those where the EC and/or EO device is constructed using a free-standing film and/or coating, there may be undesirable effects on an EO device due to unattended loss of electrolyte solvent, including uncontrolled concentration variations, crystallites forming in the EC film, and changes in film thicknesses. During manufacture of an EC device, some solvent may typically be lost due to evaporation. A solvent with a lower volatility may reduce the solvent loss and thereby reduce the undesirable effects.

For these and other reasons, a new electrolyte solvent may be desirable.

SUMMARY

According to some embodiments, an electrochromic medium for use in an electro-optic device may comprise a solvent comprising at least one low-volatile organic electrolyte solvent based on a cyclic carbonate ester; an anodic electroactive material; and a cathodic electroactive material; at least one of the anodic and cathodic electroactive materials may be electrochromic. The vapor pressure of the low volatile organic electrolyte solvent may be about 0.0023 kPa or less measured at 20 deg. C. The vapor pressure of the low volatile organic electrolyte solvent may be about one half to three quarters of the vapor pressure of propylene carbonate (PC) under the same conditions at which the vapor pressure is measured. The low volatile organic electrolyte solvent may have a boiling point of at least 350° C. at 1.0 atmosphere pressure. The solvent may comprise at least 10 wt %, at least 20 wt %, at least 30 wt %, at least 40 wt %, or at least 50 wt % of a low volatile organic electrolyte solvent based on a cyclic carbonate ester. The electrochromic medium may further comprise propylene carbonate and/or ethylene carbonate and/or gamma-butyrolactone. The low volatile electrolyte solvent may contain at least one organic cyclic carbonate ester moiety. The solvent may comprise at least one low volatile organic carbonate electrolyte solvent represented by one of the following formulae:

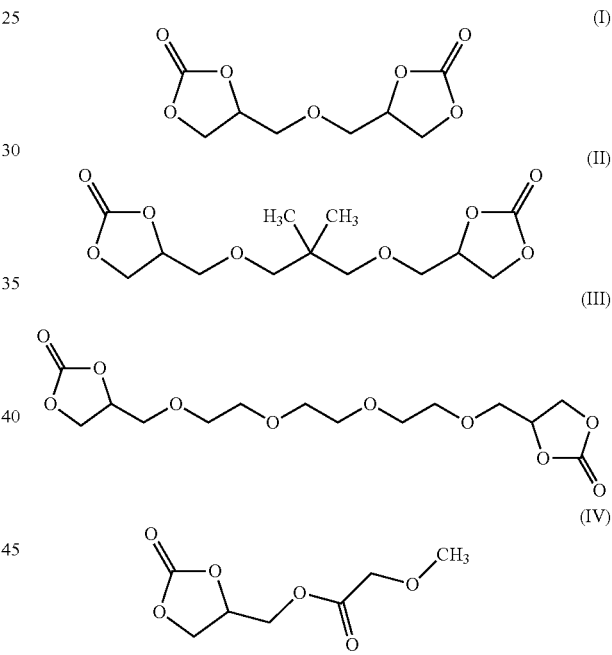

According to some embodiments, an electro-optic device may comprise a first substrate having a rear surface and a second substrate having a front surface opposed to the rear surface of the first surface; a cavity defined between the rear surface of the first substrate and the opposed front surface of the second substrate; an electrically conductive coating disposed on at least one of the rear surface of the first substrate and the front surface of the second substrate; an electrochromic medium disposed within the cavity, the electrochromic medium comprising: a solvent comprising at least one low-volatile organic electrolyte solvent based on a cyclic carbonate ester; an anodic electroactive material; and a cathodic electroactive material; wherein at least one of the anodic and cathodic electroactive materials is electrochromic. In some embodiments, one or more of the substrates may be comprised of polyethylene terephthalate (PET). In some embodiments, the electrically conductive material may be a transparent conductive material, like one of indium tin oxide (ITO) or fluorine doped tin oxide (FTO) or indium zinc oxide (IZO) or ITO-metal-ITO (IMI). The electrolyte solvent contains at least one low volatile organic carbonate solvent containing at least one cyclic organic carbonate. The low-volatile organic electrolyte solvent may comprise at least 1 wt % of bis-carbonate. The vapor pressure of the low-volatile organic carbonate solvent may be about 0.0023 kPa or less measured at 20 deg. C. The vapor pressure of the low-volatile organic carbonate solvent may be about ½ to ¾ of the vapor pressure of PC measured at the same temperature. The low-volatile organic electrolyte solvent has a boiling point of at least 350° C. at 1.0 atmosphere pressure. The solvent may comprise at least 10 wt % of a low-volatile organic electrolyte solvent based on an organic carbonate ester. The solvent may contain at least a second cyclic carbonate ester moiety. The solvent may comprise at least one low-volatile organic carbonate electrolyte solvent represented by one of the following formulae:

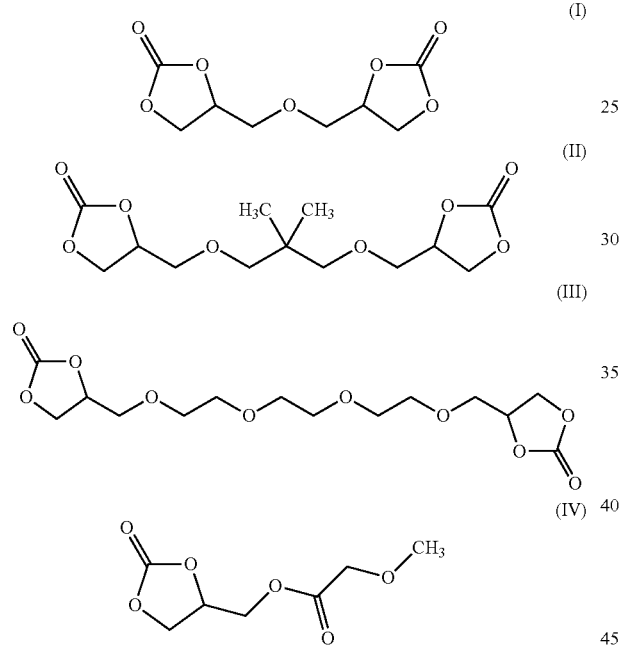

According to some embodiments, an electrolyte solvent for use in an electrochromic or electro-optic device may comprise at least 1 wt % of an organic electrolyte solvent based on a low-volatile organic cyclic carbonate ester. The electrolyte solvent may contain a low-volatile cyclic organic carbonate solvent and represented by at least one of the following formulae:

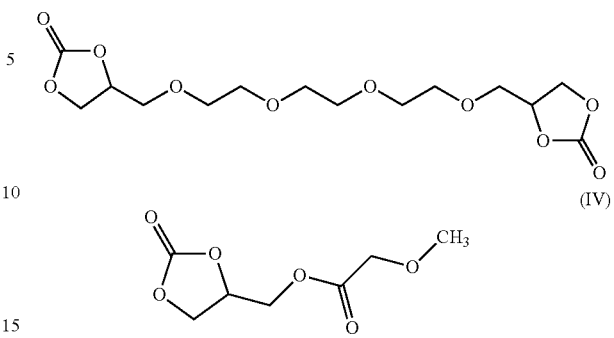

The electrolyte solvent may comprise about 70 wt % of a low-volatile organic cyclic carbonate. The electrolyte solvent may further comprise about 30 wt % propylene carbonate (PC).

According to some embodiments, a method may comprise the steps of providing a first substrate having a first surface and an opposed second substrate having a first surface opposed to the first surface of the first surface, the opposed surfaces of the first and second substrates defining a cavity therebetween, applying an electrically conductive coating to at least one of the opposed surfaces of the first and second substrates; and disposing an electrochromic medium in the cavity defined between the opposed surfaces of the first and second substrates; wherein the electrochromic medium may comprise a solvent comprising at least one low-volatile organic electrolyte solvent based on a cyclic carbonate ester, an anodic electroactive material and a cathodic electroactive material, wherein at least one of the anodic and cathodic electroactive materials may be electrochromic. The electrolyte solvent may comprise at least one low-volatile organic cyclic carbonate solvent represented by one of the following formulae:

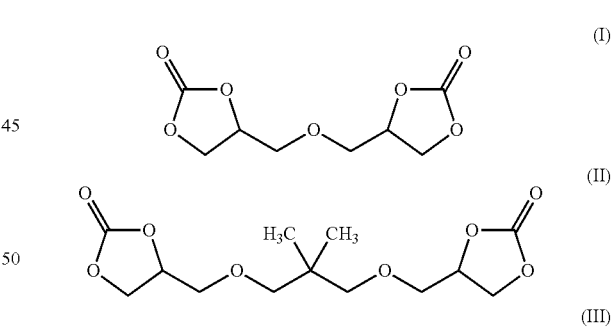

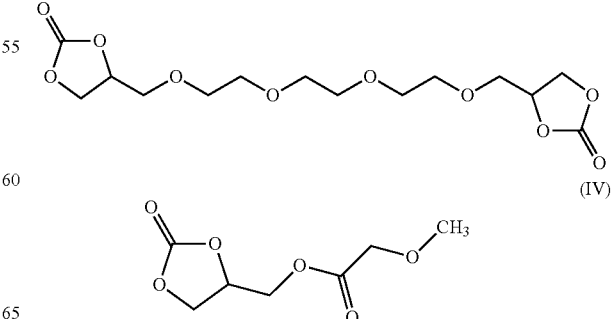

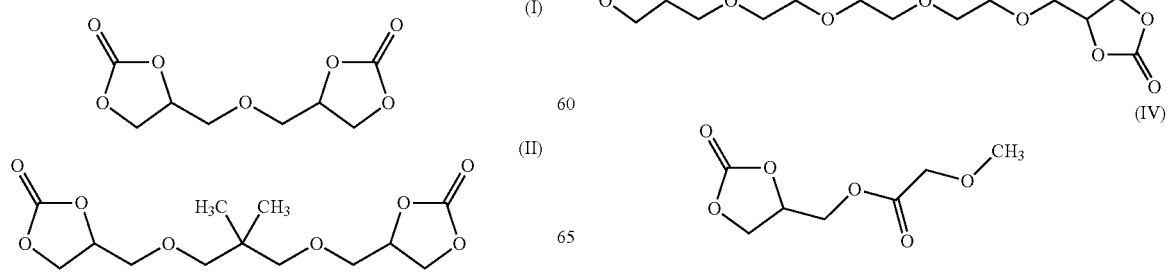

In some embodiments, at least one of the first and second substrate may comprise polyethylene terephthalate (PET). The electrically conductive coating may comprise at least one of indium tin oxide (ITO) or fluorine doped tin oxide (FTO) or indium zinc oxide (IZO) or ITO-metal-ITO (IMI).

DETAILED DESCRIPTION

Figure 1:
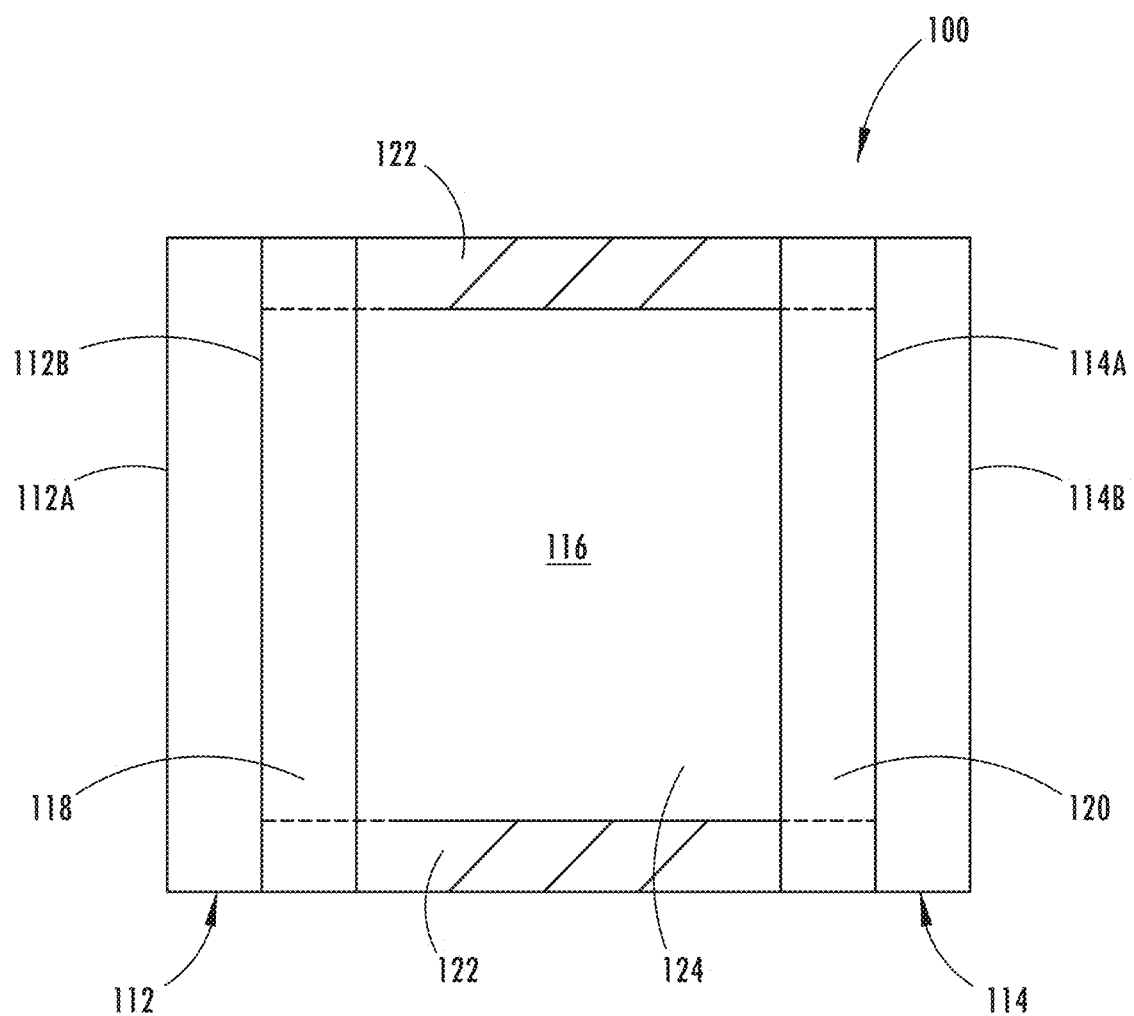
FIG. 1 is a cross-sectional schematic representation of an electro-optic device fabricated in accordance with the present disclosure.

FIG. 1 shows a cross-sectional schematic representation of electro-optic device 100, which generally comprises first substrate 112 having front surface 112A and rear surface 112B, second substrate 114 having front surface 114A and rear surface 114B, and a chamber 116 for containing an electrochromic medium 124.

One or more layers of electrically conductive material or electrode coatings 118 may be associated with rear surface 112B of first substrate 112. These layers may serve as an electrode for the electro-optic device. Electrically conductive material 118 may be a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electro-optic device or the atmosphere; and (e) exhibits minimal diffusion or specular reflectance as well as sufficient electrical conductance. Electrically conductive material 118 may be fabricated from indium tin oxide (ITO) or fluorine doped tin oxide (FTO) or indium zinc oxide (IZO) or ITO-metal-ITO (IMI) or other materials known to those having ordinary skill in the art.

Similarly, one or more layers of electrically conductive material 120 may be associated with front surface 114A of second substrate 114, and may be operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116.

Electrochromic medium 124 may generally comprise an anodic material, and a cathodic material, dissolved in at least one solvent. Typically, both the anodic and the cathodic materials are electroactive and at least one of them is electrochromic.

In some embodiments of the present disclosure, the solvent of electrochromic medium 124 may comprise a low-volatile organic electrolyte solvent. The low-volatile organic electrolyte solvent may be based on a carbonate ester, and in particular on a cyclic carbonate ester. The solvent may comprise one or more low-volatile organic electrolyte solvent. As used herein, low-volatile organic electrolyte solvent refers to a compound containing one or more —CO₃ functional groups. The low-volatile organic electrolyte solvent in the solvent may have at least one of the following formulas:

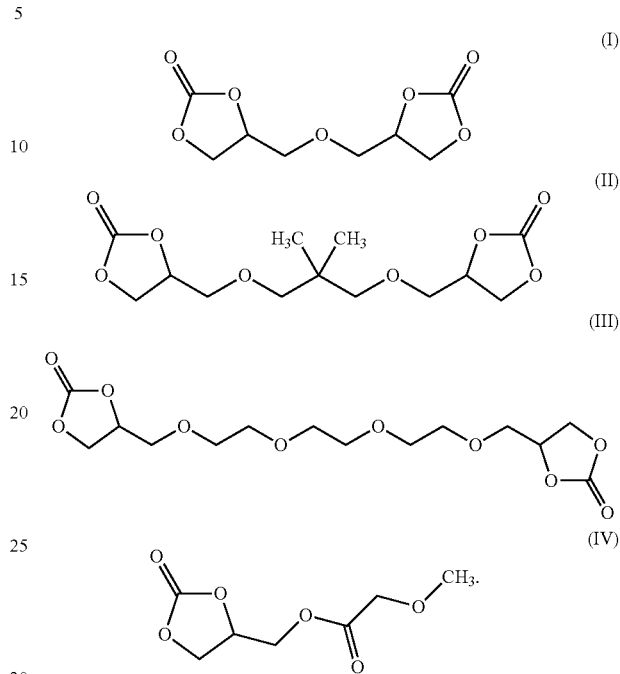

Organic electrolyte solvents based on cyclic carbonate esters such as bis-carbonates may exhibit desirable solvating and dielectric characteristics that make them good electrolyte solvents for electrochromic media.

In some embodiments, the solvent of electrochromic medium 124 may comprise a mixture of at least two components. In some embodiments, the first component may be a low-volatile organic solvent containing at least one cyclic carbonate ester moiety. The low-volatile organic cyclic carbonate may comprise at least one of formulas (I), (II), (III) and (IV) above. In some embodiments, the first component may be a mixture of at least two low-volatile organic solvents containing at least one cyclic carbonate ester moiety. The mixture of at least two low-volatile organic solvents containing at least one cyclic carbonate ester moiety may comprise at least one of formulas (I), (II), and (III) above.

The second component may comprise at least one of a number of common, commercially available solvents including 3-methylsulfolane, glutaronitrile, dimethyl sulfoxide, dimethyl formamide, acetonitrile, tetraglyme and other polyethers, alcohols such as ethoxyethanol, nitriles such as 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate (PC), ethylene carbonate and homogenous mixtures of these solvents. While specific solvents have been disclosed as being associated with the second component of the electrochromic medium or coating solvent, numerous other solvents or plasticizers that would be known to those having ordinary skill in the art having the present disclosure before them are likewise contemplated for use.

The first component may comprise at least 1 wt % of the low-volatile organic carbonate electrolyte solvent, and in particular, may comprise at least about 20 wt % of the solvent, about 30 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, or about 100 wt %, or any range including or in between any two of these values. The second component may comprise at least 1 wt % of the solvent; and in particular, may comprise at least about 20 wt % of the solvent, about 30 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, or about 100 wt %, or any range including or in between any two of these values. Weight percent or wt % may be defined by the weight of the named component as a percent of the total weight of the compound.

The low-volatile organic carbonate electrolyte solvent, when used as a component of an electrolyte solvent in an electrochromic (EC) or electro-optic (EO) device, may offer the advantages of the current solvents while differing from many currently-used electrolyte solvents in several ways. Electrolyte solvents comprising the low-volatile organic electrolyte solvent containing cyclic carbonate esters may be non-flammable or have very low flammability, and may work well at a wide range of temperatures, ranging from at least −40 deg. C. to 100 deg. C. They may be chemically compatible with other components in an EC film or fluid, including electrode coatings 118, 120 such as ITO, and may also be chemically compatible with ITO-coated polyethylene terephthalate (PET) as well as materials used in seals in EC and EO devices. The low-volatile organic carbonate electrolyte solvent may be relatively colorless and transparent, so may not interfere with the transparency of the EC or EO cell. The low-volatile organic carbonate electrolyte solvent may also have lower toxicity than many of the currently-used electrolyte solvents. For at least these reasons, they may be appropriate electrolyte solvents for use in EC cells and devices instead of or in addition to PC.

In some applications, especially those in which the EC or EO device may be exposed to a flame source or open flames, a low- or non-flammable solvent may be desirable. The low-volatile organic carbonate electrolyte solvents with their characteristic low vapor pressures, which may be less than ¾ the vapor pressures of PC, may have very low flammability or be non-flammable. Furthermore, many bis-carbonates may have high boiling points, often over 300 deg. C., over 350 deg. C., or about 400 deg. C., and solvents having boiling points in these ranges may be characterized by having low flammability. Thus, electrolyte solvents comprising low-volatile organic carbonate electrolyte solvent, with their high boiling points and low vapor pressures, may be nearly or completely non-flammable when exposed to a flame source, and thus appropriate for uses when non-flammable EO devices are desired.

Current technologies may limit the potential size of an EC or EO device, or may limit the functionality of larger EC or EO devices. However, using a solvent comprising a low-volatile organic carbonate electrolyte solvent may allow the manufacture of larger EC and EO devices than is possible with existing electrolyte solvents. When making larger EC or EO devices, it may be desirable to laminate at least one EC or EO film between two electrodes 118, 120 to make the device. The films may be very thin; in some cases, for example, less than 100 microns thick. Electrochromic media 124 comprising currently-used electrolyte solvents may exhibit partial or complete loss of the electrolyte solvent prior to the encapsulation of the film, likely due to evaporation. The loss of the electrolyte solvent may lead to undesirable effects on the final device, such as uncontrolled concentration variations, crystallites forming in the film, and uncontrolled film thicknesses, and may lead to uneven coloration and defects. Using an electrolyte solvent with a very low vapor pressure and a high boiling point, such as one comprising a low volatile organic carbonate electrolyte solvent, may minimize evaporation and the accompanying loss of electrolyte solvent. This may also result in higher quality EC and EO devices as undesirable effects due to loss of the electrolyte solvents may be reduced or eliminated.

In some embodiments, organic electrolyte solvents comprising low-volatile organic cyclic carbonates may have higher viscosities than many commonly used electrolyte solvents, which may result in slower diffusion rates of the anodic and cathodic materials. EC and EO devices using these solvents may darken or clear more slowly than devices having a traditional solvent. With a solution-based electrochromic device, the device also may exhibit lower currents at steady state. In certain EO device applications and constructions, longer clearing and darkening times and lower steady-state currents may be desirable. For example, solution based electrochromic devices using very thin (<0.6 mm) first and/or second substrates 112, 114 may require the use of in-view glass beads to ensure adequate uniform spacing between first and second substrates 112, 114. To ensure that the in-view beads are difficult to visually see, it is desirable to have spacing between first and second substrates 112 and 114 less than or equal to 40 microns. However, the smaller spacing between the first and second substrates may result in uneven darkening and clearing. Longer clearing and darkening times may allow these devices to color more uniformly.

Figure 2A:
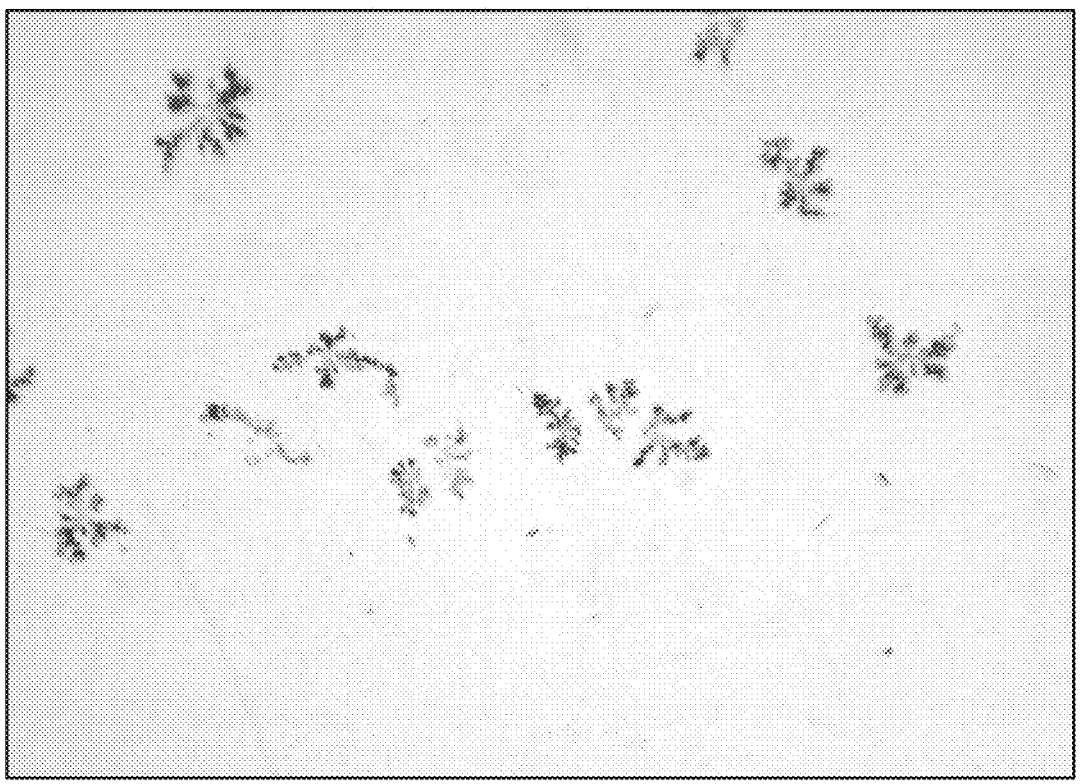
FIG. 2(a) polyethylene terephthalate (PET) substrate coated with 60 ohm/square ITO prior to exposure to low volatile organic cyclic carbonate electrolyte solvent III.
Figure 2B:
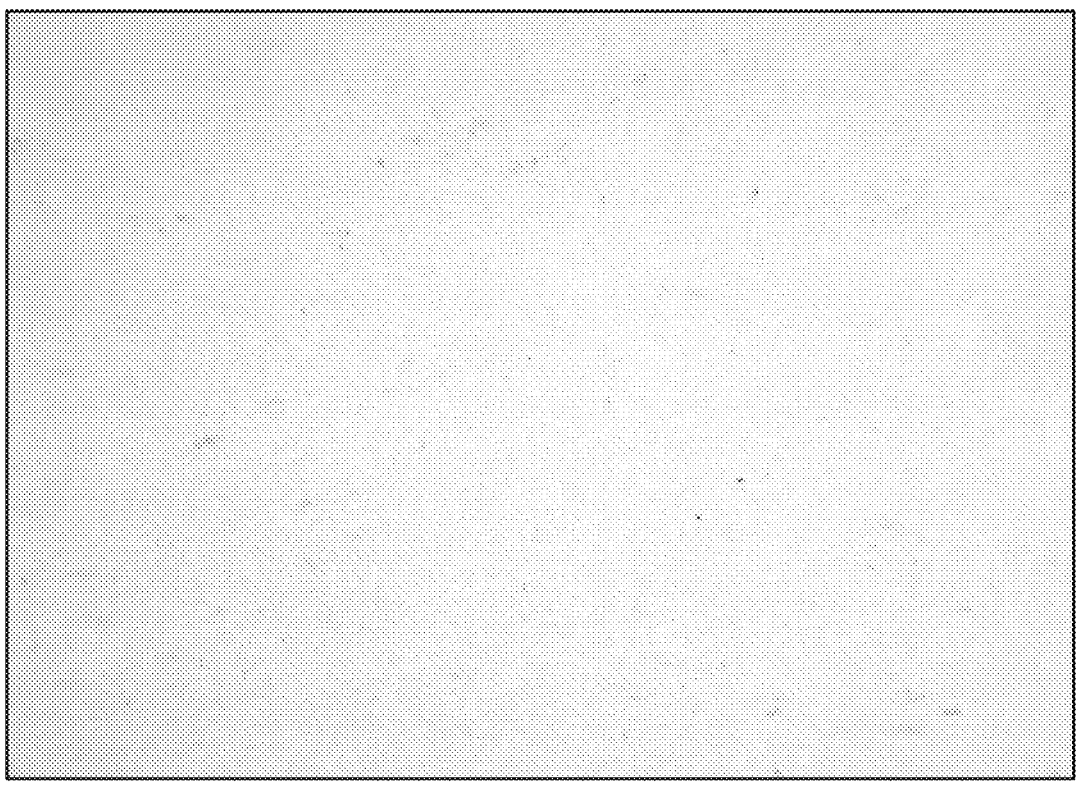
FIG. 2(b) polyethylene terephthalate (PET) substrate coated with 60 ohm/square ITO prior to exposure to electrolyte solvent PC.
Figure 2C:
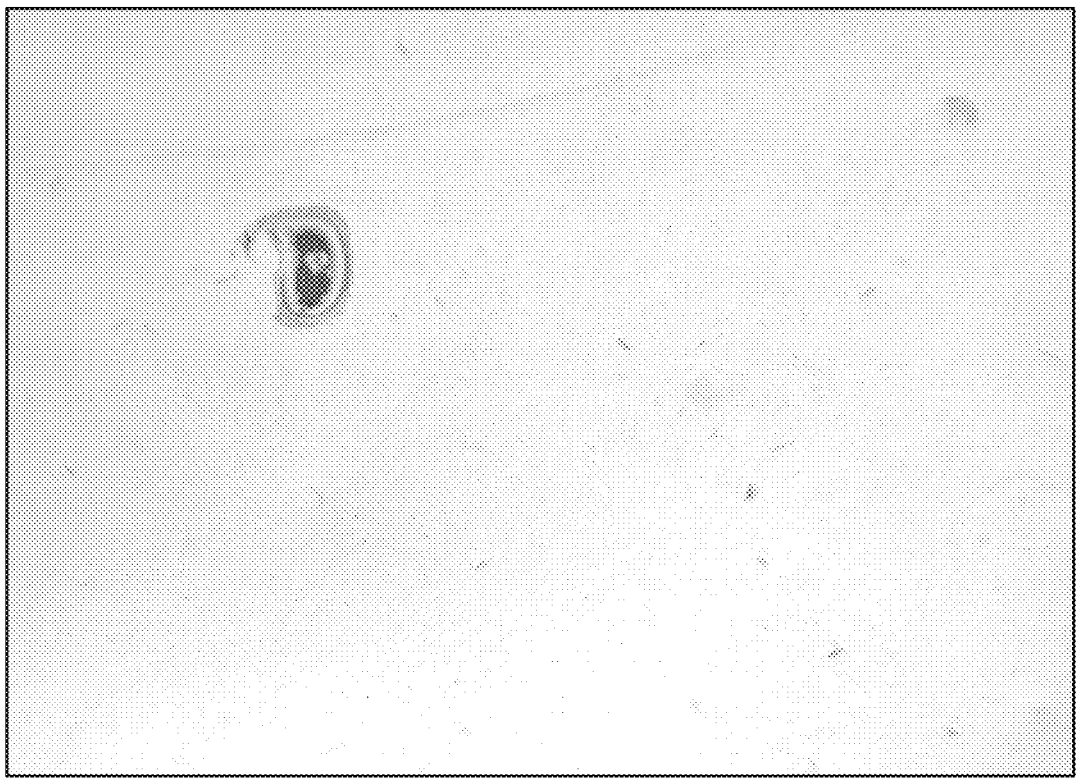
FIG. 2(c) illustrates substrate FIG. 2(a) after 208 hours of exposure at 85 deg. C. to low volatile organic cyclic carbonate electrolyte solvent III.
Figure 2D:
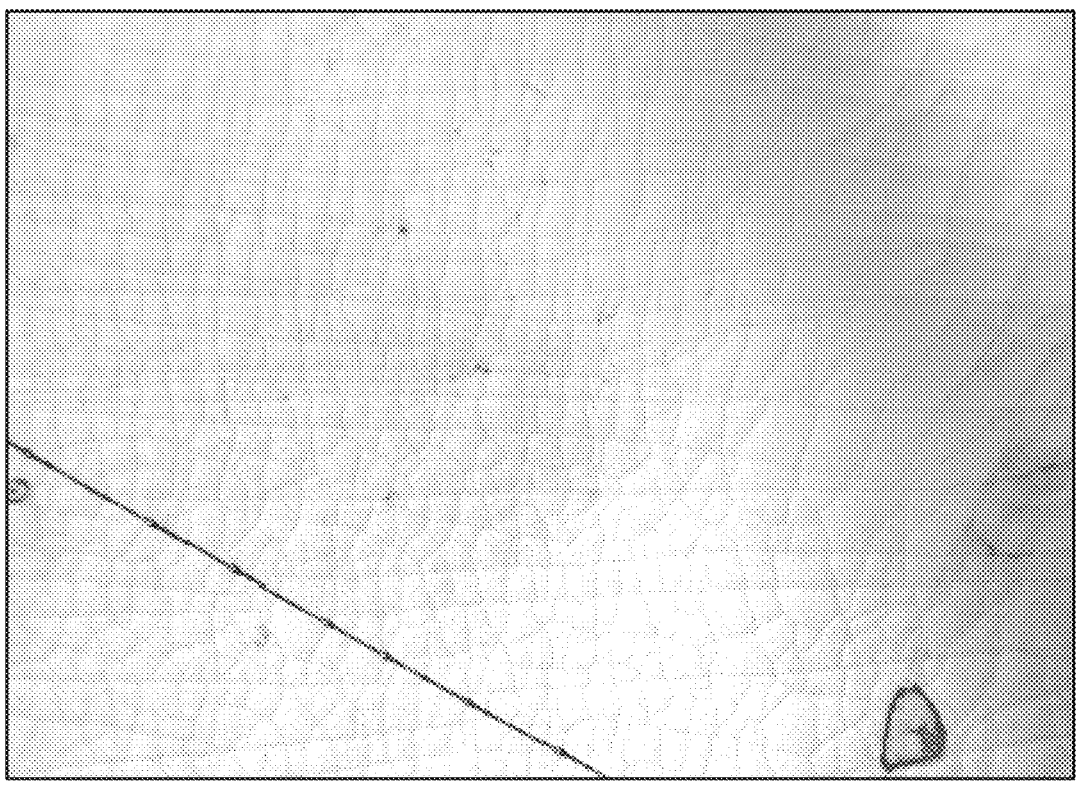
FIG. 2(d) illustrates substrate FIG. 2(b) after 208 hours of exposure at 85 deg. C. to electrolyte solvent PC.

An electrolyte solvent comprising a low-volatile organic cyclic carbonate may be more compatible with some coated substrates, especially plastic substrates such as polyethylene terephthalate (PET), than a traditional electrolyte solvent is. In some circumstances, it may be desirable to fabricate first substrate 112 and second substrate 114 from a plastic substrate, such as PET, coated with ITO or another appropriate electrically conductive coating. However, when traditional electrolyte solvents are used with ITO-coated PET substrates, the ITO may show unacceptable levels of cracking and bubbling, especially after exposure to elevated temperatures. As shown in FIG. 2(d), an electro-optic device with PET substrates and a traditional EC solvent such as PC that does not contain a low-volatile organic carbonate solvent may exhibit cracking, bubbling, and some delamination after exposure to temperatures as low as 85 deg. C. in as little as 208 hours of exposure or less. The cracking and bubbling may be so severe that conductivity may be lost. In some cases, the traditional solvent may cause delamination of the ITO or other electrically-conductive coating from the PET substrate. This incompatibility of traditional electrolyte solvents in combination with PET substrates may preclude the use of this combination. However, an EC or EO device using an electro-optic medium having an electrolyte solvent comprising low-volatile organic cyclic carbonate and an ITO-coated PET substrate may not be vulnerable to these types of damage. As shown in FIG. 2(b), ITO coatings on PET substrates in contact with low-volatile organic cyclic carbonate solvent, solvent (III), shows no noticeable cracking or bubbling after 208 hours of 85 deg. C. exposure.

EXAMPLES

It will be understood that in the following examples, conventional chemical abbreviations will be used when appropriate including the following: grams (g); milliliters

Example 1

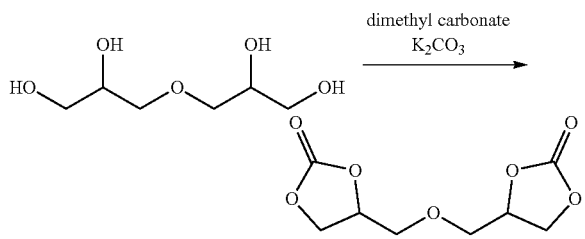

A three-neck 2.0 L flask was equipped with a magnetic stirbar, condenser, and temperature probe, and the flask was charged with diglycerol (0.130 L, 1.00 mol), dimethyl carbonate (0.500 L, 6.00 mol), and potassium carbonate (0.830 g, 0.600 mmol). The mixture was heated to 70° C. and stirred under argon for 18 hours, during which the two-phase mixture became heterogeneous. The condenser was replaced with a distillation adaptor, and stirring was continued at 70° C. until a 300 mL volume of distillate had been collected. The distillate was discarded, and the reaction mixture was allowed to cool to ambient temperature upon standing. The suspension was suction filtered through a paper, then concentrated to a viscous yellow oil under reduced pressure. The oil was suspended in ethyl acetate and the stirred mixture was heated to reflux. Upon cooling to ambient temperature, the desired product crystallized from the mixture as a colorless solid (138 g). In some instances, potassium carbonate may be present in the isolated solid. It may be removed by dissolving the solid in a minimal volume of refluxing acetone, suction-filtering the hot suspension through a Buchner funnel, and cooling the filtrate at −20° C. to promote crystallization of the dissolved bis-carbonate.

Example 2

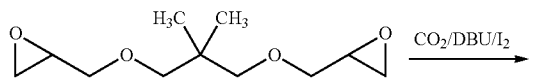

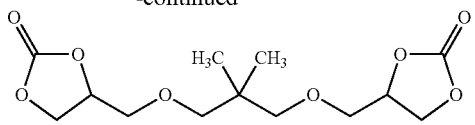

The indicated bis-carbonate compound was synthesized from neopentyl glycol diglycidyl ether using a procedure analogous to one reported by Coulembier et. al. (J. CO2 Util. 2015 (10), 7-11). A one-neck 250 mL flask was equipped with a magnetic stirbar, a gas bubbler, charged with neopentyl glycol diglycidyl ether (50.01 g, 0.231 mol), and bubbled with nitrogen for 50 min. Iodine (2.92 g, 11.5 mmol) and DBU (1,8-diazabicyclo[5.4.0]undec-7-ene; 1.73 g, 11.4 mmol) were added to the reaction flask and purged with nitrogen for an additional 15 min. The flask was lowered into an oil bath preheated to 65° C. and stirred 15 min. The gas source was changed to carbon dioxide and the solution bubbled for 1 min at a rapid rate, then reduced to one bubble every 2 to 3 s. After 21 h GC-MS showed 59% product, 29% monocarbonate, and 7% starting material. The reaction was continued for one month after which time GC-MS showed 85% product, 14% monocarbonate, and 1% starting material. The crude, reddish-brown oil was dissolved in dichloroethane (1 g oil per 5 mL solvent) and filtered through a silica gel plug, then washed with aqueous sodium bisulfite, deionized water, and brine. The organic layer was dried over magnesium sulfate and filtered through a fluted paper, then concentrated to a colorless oil under reduced pressure (55° C. at 10 Torr). The residue was further dried in vacuo (ambient temperature at <1 Torr), affording a low-melting, colorless crystalline solid.

Example 3

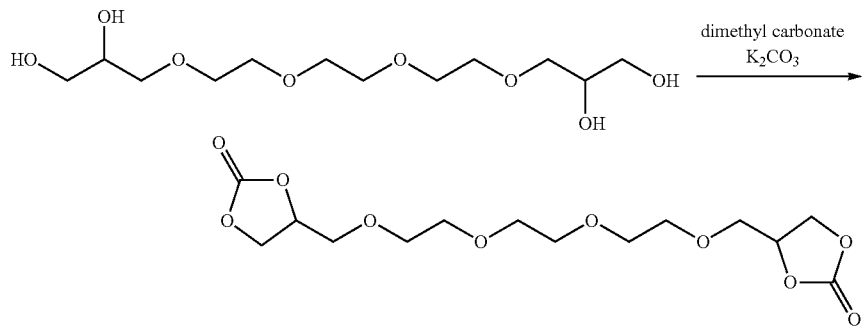

A three-neck 500 mL flask was equipped with a magnetic stirbar, condenser, and temperature probe, and the flask was charged with triethylene glycol bis(2,3-dihydroxypropane) (56.5 g, 0.189 mol), dimethyl carbonate (0.108 L, 1.28 mol), and potassium carbonate (0.177 g, 1.28 mmol). The mixture was heated to 70° C. and stirred under argon for 18 h, during which the two-phase mixture became heterogeneous. The condenser was replaced with a distillation adaptor, and stirring was continued at 70° C. until a 65 mL volume of distillate had been collected. The distillate was discarded, and the reaction mixture was allowed to cool to ambient temperature upon standing. The suspension was treated with activated carbon and suction-filtered through a Buchner, then concentrated to a viscous, cloudy, light yellow oil under reduced pressure (35.4 g, 47.2% yield). The cloudiness of the reaction product prompted attempts to further purify the compound by heating under vacuum (10 mTorr), which led to distillation of a colorless liquid at approx. 170° C.

The compound was qualitatively evaluated as a flame-retardant formulation additive by gelation of 1-2 g of liquid with fumed silica and subsequent exposure of the gel to an open flame, and the vapor pressure of the liquid may be insufficient to support ignition. In contrast, propylene carbonate gelled with fumed silica ignited when exposed to an open flame and continued to burn long after the flame for the propane torch is removed.

The ability of the compound to perform as an electrolyte was qualitatively assessed by preparing splat cells. In a disposable vial, the cathodic material octyl viologen tetrafluoroborate (0.140 g, 0.250 mmol) and anodic material bis-5,10-[2-(triethylammonium)ethyl]-5,10-dihydrophenazine bis(tetrafluoroborate) (0.160 g, 0.250 mmol) were stirred with the reported bis-carbonate liquid (11.0 g) and heated at 40-50° C. to promote dissolution. Half of the solution was transferred to a separate vial containing tetraethylammonium tetrafluoroborate (0.109 g, 0.502 mmol), and the solid was dissolved with continued stirring. To each vial was then added 0.250 mm glass spacer beads (0.300 g) and then Aerosil 300 (0.360 g), and the mixtures were stirred with wooden applicators. In turn, a small portion of the gelled mixture from each vial was distributed between a pair of ITO-coated glass plates and held at 1.20 V. In neither splat cell was darkening observed, suggesting that the viscosity of the bis-carbonate liquid—or entrainment of dissolved cations by the short polyether component—excessively hinders ion mobility in the device. To the gels in both vials were then added equal amounts of propylene carbonate (2.35 g); after mixing once more with wooden applicators, a small amount of material from each gel was distributed between a pair of ITO-coated glass plates and held at 1.20 V. Both devices darkened rapidly and cleared upon shorting, indicating that an electrolyte solvent composed of approx. 70 wt % bis-carbonate and 30 wt % propylene carbonate supports sufficient ion mobility for rapid darkening and clearing in a crude EC device.

Example 4

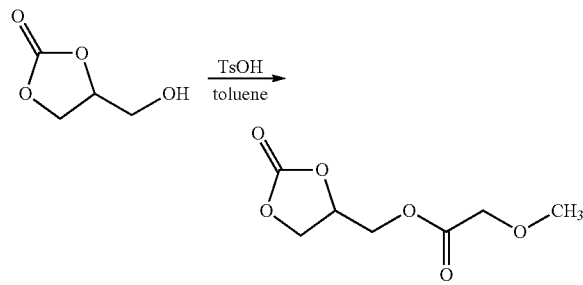

A 250 mL flask equipped with a magnetic stirbar and a Dean-Stark trap was charged with methoxyacetic acid (31.6 g, 0.351 mmol), glycerol carbonate (29.5 g, 0.250 mol), toluene (120 g), and p-toluenesulfonic acid (0.5 g, 3 mmol). The mixture was heated to reflux while stirring magnetically over several hours until azeotropic co-distillation of water ceased, at which point the reaction was allowed to cool to ambient temperature and washed with aqueous $NaHCO_3$ (0.10 M, 1×100 mL). The organic layer was concentrated to an oil under reduced pressure and then purified by vacuum distillation (142-145° C. at 1 mTorr), affording a colorless liquid (45.5 g, 34.2% yield).

It will be understood that in this disclosure electro-optic device 100 may comprise, for illustrative purposes only, a mirror, a window, a display device, a contrast enhancement filter, and the like. It will be further understood that FIG. 1 is merely a schematic representation of electro-optic device 100. As such, some of the components have been distorted from their actual scale for pictorial clarity. Indeed, numerous other electrochromic or electro-optic device configurations are contemplated for use, including those disclosed in U.S. Pat. No. 5,818,625 entitled "Electrochromic Rearview Mirror Incorporating A Third Surface Metal Reflector" and U.S. Pat. No. 6,597,489 entitled "Electrode Design For Electrochromic Devices," both of which are incorporated herein by reference in their entirety.

It will also be understood that regardless of its ordinary meaning, the term "electroactive" will be defined herein as a material that undergoes a modification in its oxidation state upon exposure to a particular electrical potential difference. Additionally, the term "electrochromic" will be defined herein, regardless of its ordinary meaning, as a material that exhibits a change in its extinction coefficient at one or more wavelengths upon exposure to a particular electrical potential difference.

According to aspect 1, an electrochromic medium for use in an electro-optic device, comprises: a solvent comprising at least one low-volatile organic electrolyte solvent based on a cyclic carbonate ester; an anodic electroactive material; and a cathodic electroactive material; wherein at least one of the anodic and cathodic electroactive materials is electrochromic.

Aspect 2: The electrochromic medium of aspect 1, wherein the vapor pressure of the low-volatile organic electrolyte solvent is 0.0023 kPa or less measured at 20 deg. C.

Aspect 3: The electrochromic medium of at least one of the previous aspects, wherein the low-volatile organic electrolyte solvent has a boiling point of at least 350° C. at 1.0 atmosphere pressure.

Aspect 4: The electrochromic medium of at least one of the previous aspects, wherein the solvent comprises at least 10 wt % of a low-volatile organic electrolyte solvent based on an organic carbonate ester.

Aspect 5: The electrochromic medium of at least one of the previous aspects, wherein the solvent comprises at least 20 wt % of a low-volatile organic electrolyte solvent based on an organic carbonate ester.

Aspect 6: The electrochromic medium of at least one of the previous aspects, wherein the solvent comprises at least 30 wt % of a low-volatile organic electrolyte solvent based on an organic carbonate.

Aspect 7: The electrochromic medium of at least one of the previous aspects, wherein the solvent further comprises at least 20 wt % propylene carbonate.

Aspect 8: The electrochromic medium of at least one of the previous aspects, wherein the solvent comprises at least 50 wt % of a low-volatile organic electrolyte solvent based on an organic carbonate ester.

Aspect 9: The electrochromic medium of at least one of the previous aspects, wherein the solvent contains at least a second cyclic carbonate ester moiety.

Aspect 10: The electrochromic medium of at least one of the previous aspects, wherein the at least one low-volatile organic electrolyte solvent comprises a bis-carbonate.

Aspect 11: The electrochromic medium of at least one of the previous aspects, wherein the solvent comprises at least 10 wt % of bis-carbonate.

Aspect 12: The electrochromic medium of at least one of the previous aspects, wherein the solvent comprises at least one low-volatile organic carbonate solvent represented by one of the following formulae:

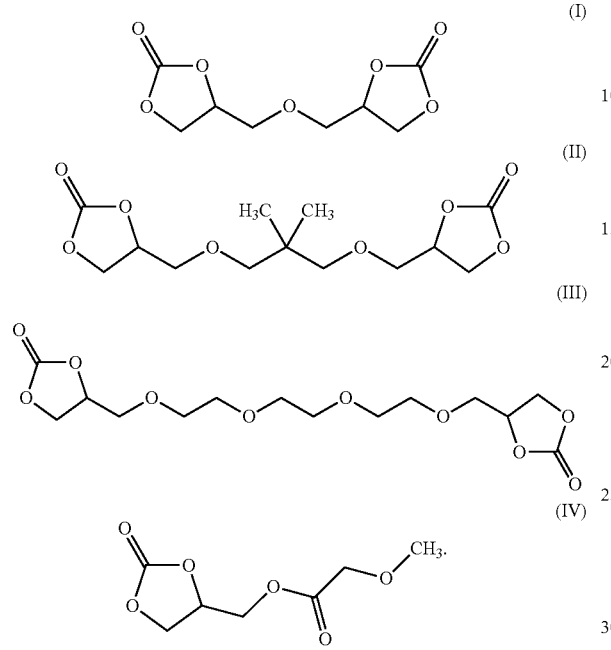

According to aspect 13, an electro-optic device comprises: a first substrate having a rear surface and a second substrate having a front surface opposed to the rear surface of the first surface; a cavity defined between the opposed rear surface of the first substrate and the front surface of the second substrate; an electrically conductive coating disposed on at least one of the rear surface of the first substrate and the front surface of the second substrate; an electrochromic medium disposed within the cavity, the electrochromic medium comprising: a solvent comprising at least one low-volatile organic electrolyte solvent based on a cyclic carbonate ester; an anodic electroactive material; and a cathodic electroactive material; wherein at least one of the anodic and cathodic electroactive materials is electrochromic.

Aspect 14: The electro-optic device of aspect 13 wherein at least one of the substrates comprises polyethylene terephthalate.

Aspect 15: The electro-optic device of at least one of aspects 13-14, wherein the electrically conductive material is one of indium tin oxide (ITO) or fluorine doped tin oxide (FTO) or indium zinc oxide (IZO) or ITO-metal-ITO (IMI).

Aspect 16: The electro-optic device of at least one of aspects 13-15, wherein the solvent comprises at least 10 wt % of a low-volatile organic electrolyte solvent based on a cyclic carbonate ester.

Aspect 17: The electro-optic device of at least one of aspects 13-16, wherein the at least one low-volatile organic electrolyte solvent comprises a bis-carbonate.

Aspect 18: The electro-optic device of at least one of aspects 13-17, wherein the solvent comprises at least 1 wt % of a bis-carbonate.

Aspect 19: The electro-optic device of at least one of aspects 13-18, wherein the vapor pressure of the low-volatile organic electrolyte solvent is about 0.0023 kPa or less when measured at 20 deg. C.

Aspect 20: The electro-optic device of at least one of aspects 13-19, wherein the low-volatile organic electrolyte solvent has a boiling point of at least 350° C. at 1.0 atmosphere pressure.

Aspect 21: The electro-optic device of at least one of aspects 13-20, wherein the solvent contains at least a second cyclic carbonate ester moiety.

Aspect 22: The electro-optic device of at least one of aspects 13-21, wherein the solvent comprises at least one low-volatile organic carbonate electrolyte solvent represented by one of the following formulae:

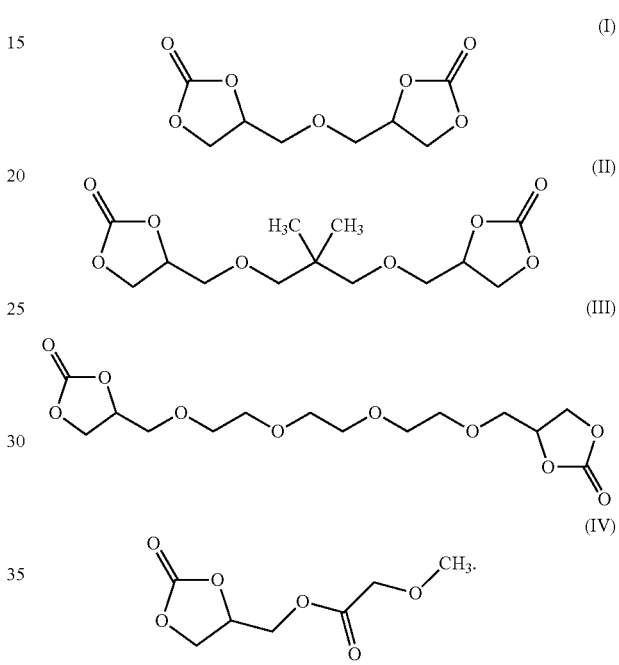

Aspect 23: An electrolyte solvent for use in an electrochromic medium comprises at least 1 wt % of a low-volatile organic electrolyte solvent based on a cyclic carbonate ester.

Aspect 24: The electrolyte solvent of aspect 23, wherein the solvent comprises at least a second cyclic carbonate ester moiety.

Aspect 25: The electrolyte solvent of at least one of aspects 23-24, wherein the low-volatile organic electrolyte solvent comprises a bis-carbonate.

Aspect 26: The electrolyte solvent of at least one of aspects 23-25, wherein the organic electrolyte solvent is a low-volatile organic solvent represented by at least one of the following formulae:

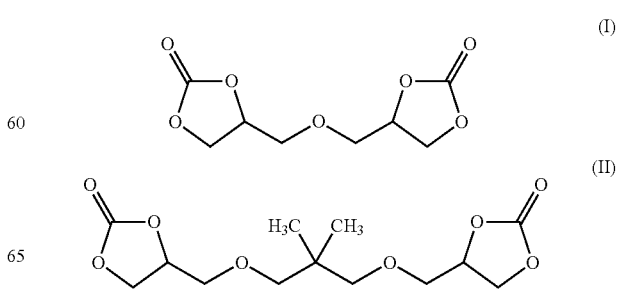

-continued

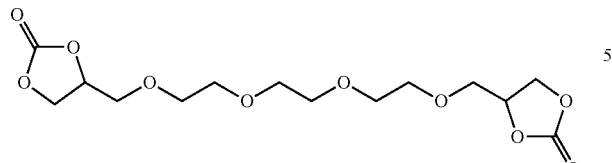

(III)

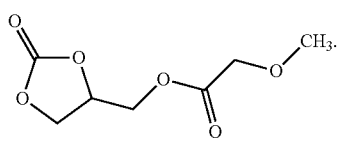

(IV)

Aspect 27: The electrolyte solvent of at least one of aspects 23-26, wherein the electrolyte solvent comprises about 70 wt % of a low-volatile organic electrolyte solvent.

Aspect 28: The electrolyte solvent of at least one of aspects 23-27, further comprising about 30 wt % propylene carbonate.

Aspect 29: A method comprising the steps of: providing a first substrate having a first surface and an opposed second substrate having a first surface opposed to the first surface of the first substrate, the opposed surfaces of the first and second substrates defining a cavity therebetween; applying an electrically conductive coating to at least one of the opposed surfaces of the first and second substrates; and disposing an electrochromic medium in the cavity defined between the opposed surfaces of the first and second substrates; wherein the electrochromic medium comprises a solvent comprising: at least one low-volatile organic electrolyte solvent based on a cyclic carbonate ester; an anodic electroactive material; and a cathodic electroactive material; wherein at least one of the anodic and cathodic electroactive materials is electrochromic.

Aspect 30: The method of aspect 29, wherein the at least one low-volatile organic electrolyte solvent comprises at least one bis-carbonate.

Aspect 31: The method of at least one of aspects 29-30, wherein the solvent comprises at least one low-volatile organic electrolyte solvent represented by one of the following formulae:

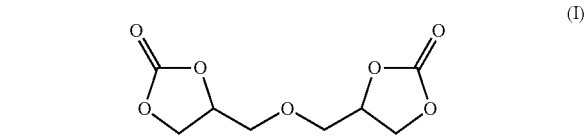

(I)

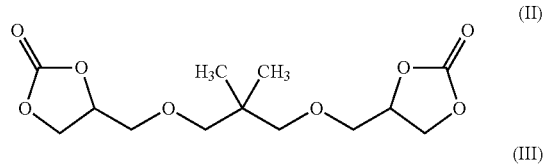

(II)

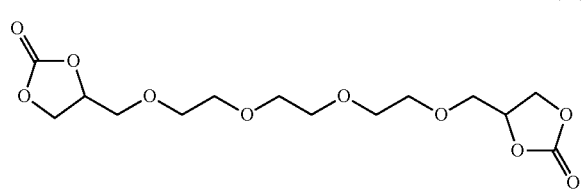

(III)

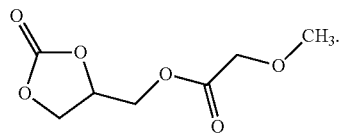

(IV)

Aspect 32. The method of at least one of aspects 28-30, wherein at least one of the first and second substrates comprises polyethylene terephthalate.

Aspect 33: The method of at least one of aspects 28-31, wherein the electrically conductive coating comprises at least one of indium tin oxide (ITO) or fluorine doped tin oxide (FTO) or indium zinc oxide (IZO) or ITO-metal-ITO (IMI).

Modifications of the above disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context Recitation of ranges of values herein are merely intended to serve as a shorthand method of referring individually to each separate value falling within the range, unless otherwise indicated herein, and each separate value is incorporated into the specification as if it were individually recited herein. As will be understood by one skilled in the art, for any and all purposes, particularly in terms of providing a written description, all ranges disclosed herein also encompass any and all possible subranges and combinations of subranges thereof. As will also be understood by one skilled in the art all language such as "up to," "at least," "greater than," "less than," and the like include the number recited and refer to ranges which can be subsequently broken down into subranges as discussed above. As used herein, "about" and "approximately" will be understood by persons of ordinary skill in the art and will vary to some extent depending upon the context in which it is used. If there are uses of the term which are not clear to persons of ordinary skill in the art, given the context in which it is used, "about" and "approximately" will mean up to plus or minus 10% of the particular term.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It should be noted that references to "front," "back," "rear," "upward," "downward," "inner," "outer," "right," and "left" in this description are merely used to identify the various elements as they are oriented in the FIGURE. These terms are not meant to limit the element which they describe, as the various elements may be oriented differently in various applications.

The invention claimed is:

1. An electrochromic medium for use in an electro-optic device, comprising:
   a solvent comprising at least one low-volatile organic electrolyte solvent based on a cyclic carbonate ester;
   an anodic electroactive material; and
   a cathodic electroactive material;
   wherein at least one of the anodic and cathodic electroactive materials is electrochromic; and
   wherein the solvent comprises at least one low-volatile organic electrolyte solvent represented by one of the following formulae:

8. An electro-optic device comprising:
   a first substrate having a rear surface and a second substrate having a front surface opposed to the rear surface of the first surface;
   a cavity defined between the opposed rear surface of the first substrate and the front surface of the second substrate;
   an electrically conductive coating disposed on at least one of the rear surface of the first substrate and the front surface of the second substrate;
   an electrochromic medium disposed within the cavity, the electrochromic medium comprising:
   a solvent comprising at least one low-volatile organic electrolyte solvent based on a cyclic carbonate ester;
   an anodic electroactive material; and
   a cathodic electroactive material;
   wherein at least one of the anodic and cathodic electroactive materials is electrochromic; and
   wherein the solvent comprises at least one low-volatile organic electrolyte solvent represented by one of the following formulae:

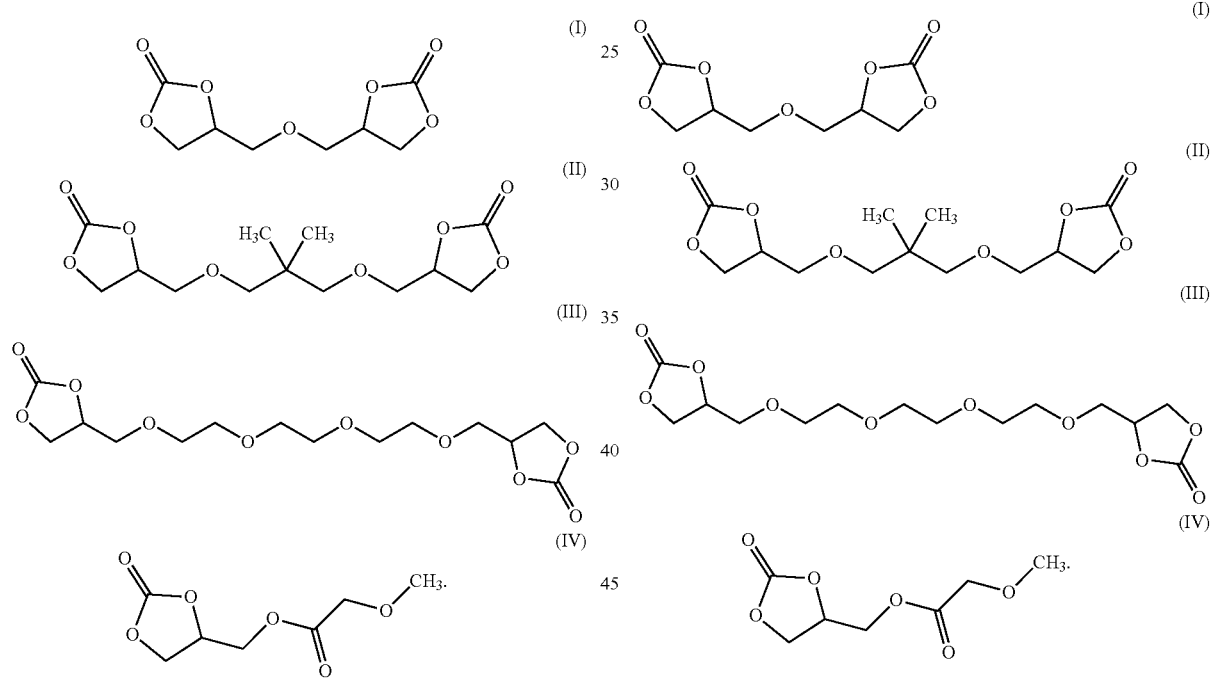

2. The electrochromic medium of claim 1, wherein the vapor pressure of the low-volatile organic electrolyte solvent is 0.0023 kPa or less measured at 20 deg. C.

3. The electrochromic medium of claim 1, wherein the low-volatile organic electrolyte solvent has a boiling point of at least 350° C. at 1.0 atmosphere pressure.

4. The electrochromic medium of claim 1, wherein solvent comprises at least 10 wt % of a low-volatile organic electrolyte solvent based on an organic carbonate ester.

5. The electrochromic medium of claim 1, wherein the solvent contains at least a second cyclic carbonate ester moiety.

6. The electrochromic medium of claim 1, wherein the at least one low-volatile organic electrolyte solvent comprises a bis-carbonate.

7. The electrochromic medium of claim 1, wherein the solvent comprises at least 10 wt % of bis-carbonate.

9. The electro-optic device of claim 8 wherein at least one of the substrates comprises polyethylene terephthalate.

10. The electro-optic device of claim 8, wherein the electrically conductive material is one of indium tin oxide (ITO) or fluorine doped tin oxide (FTO) or indium zinc oxide (IZO) or ITO-metal-ITO (IMI).

11. The electro-optic device of claim 8, wherein the solvent comprises at least 10 wt % of a low-volatile organic electrolyte solvent based on a cyclic carbonate ester.

12. The electro-optic device of claim 8, wherein the at least one low-volatile organic electrolyte solvent comprises a bis-carbonate.

13. The electro-optic device of claim 8, wherein the solvent contains at least a second cyclic carbonate ester moiety.

14. A method comprising the steps of:
   providing a first substrate having a first surface and an opposed second substrate having a first surface opposed to the first surface of the first substrate, the opposed surfaces of the first and second substrates defining a cavity therebetween;

applying an electrically conductive coating to at least one of the opposed surfaces of the first and second substrates; and disposing an electrochromic medium in the cavity defined between the opposed surfaces of the first and second substrates;

wherein the electrochromic medium comprises a solvent comprising:
  at least one low-volatile organic electrolyte solvent based on a cyclic carbonate ester;
  an anodic electroactive material; and
  a cathodic electroactive material;
  wherein at least one of the anodic and cathodic electroactive materials is electrochromic; and wherein the solvent comprises at least one low-volatile organic electrolyte solvent represented by one of the following formulae:

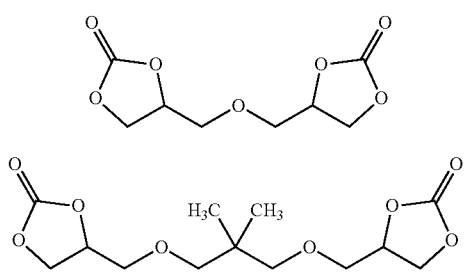

(I)

(II)

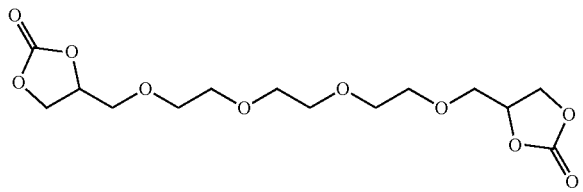

(III)

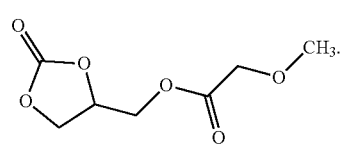

(IV)

15. The method of claim 14, wherein the at least one low-volatile organic electrolyte solvent comprises at least one bis-carbonate.

16. The method of claim 14, wherein at least one of the first and second substrates comprises polyethylene terephthalate.

17. The method of claim 14, wherein the electrically conductive coating comprises at least one of indium tin oxide (ITO) or fluorine doped tin oxide (FTO) or indium zinc oxide (IZO) or ITO-metal-ITO (IMI).

* * * * *